Nov. 3, 1936.                B. E. GAVIN                2,059,573
                              PIPE CLAMP
                         Filed May 11, 1932          3 Sheets-Sheet 2
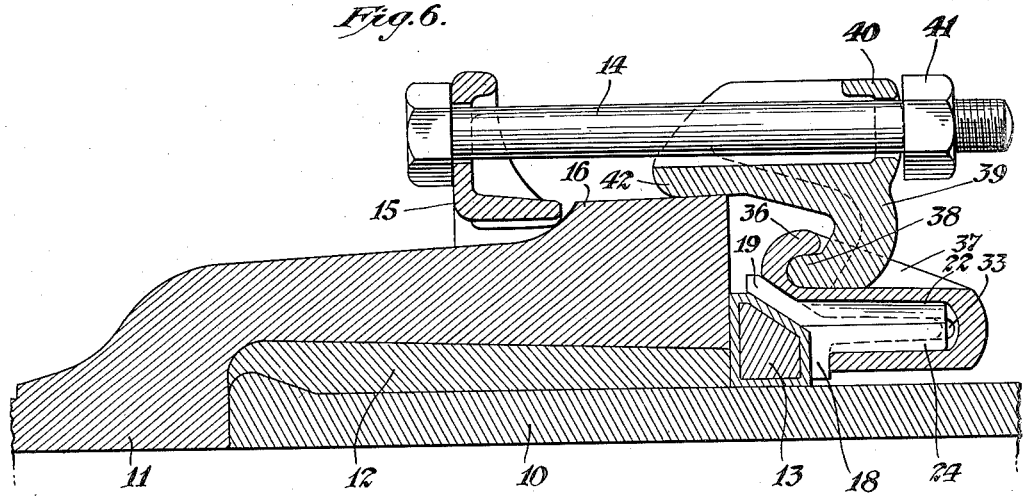
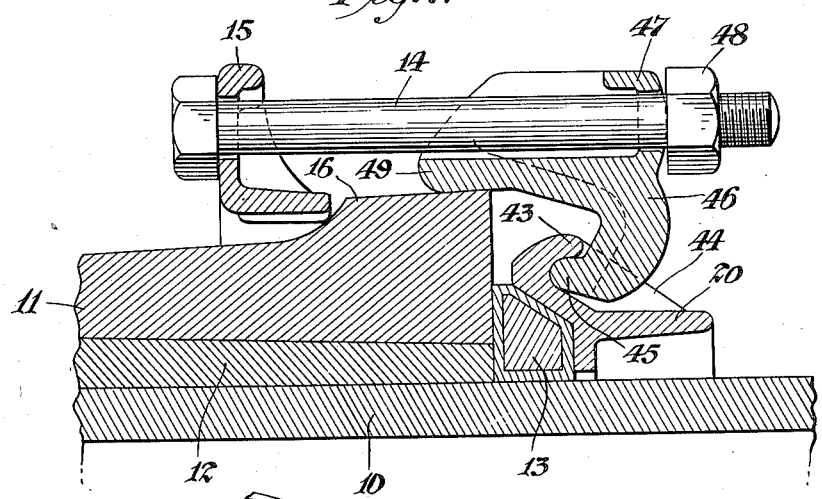
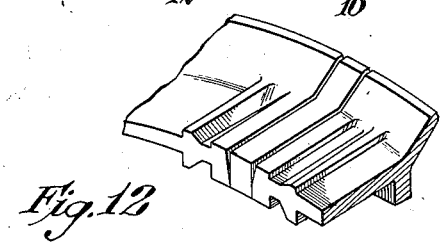
INVENTOR
Beauford E. Gavin
BY
HIS ATTORNEY Nov. 3, 1936. B. E. GAVIN 2,059,573
PIPE CLAMP
Filed May 11, 1932 3 Sheets-Sheet 3
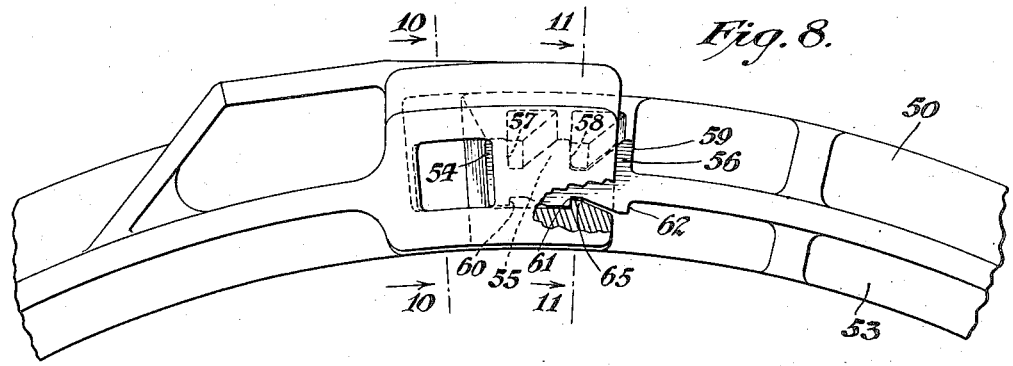
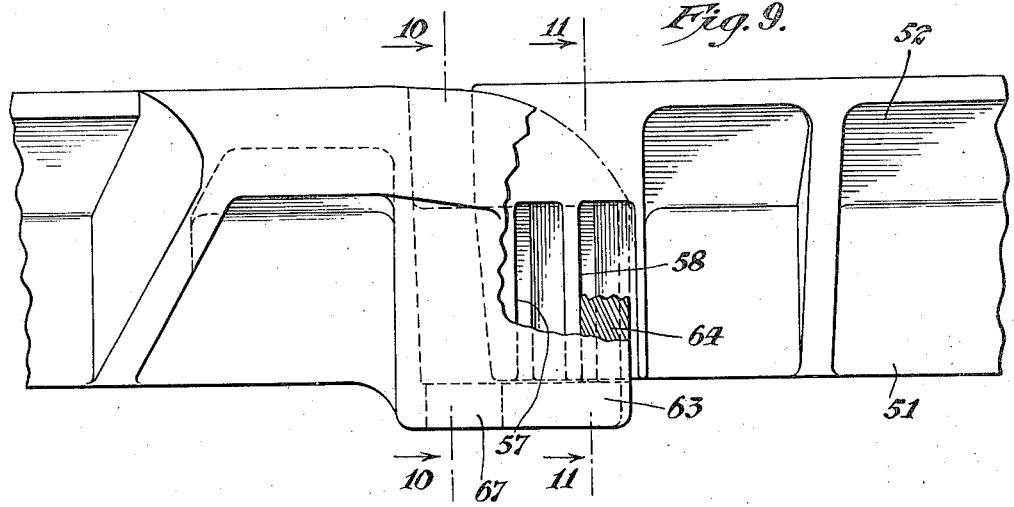
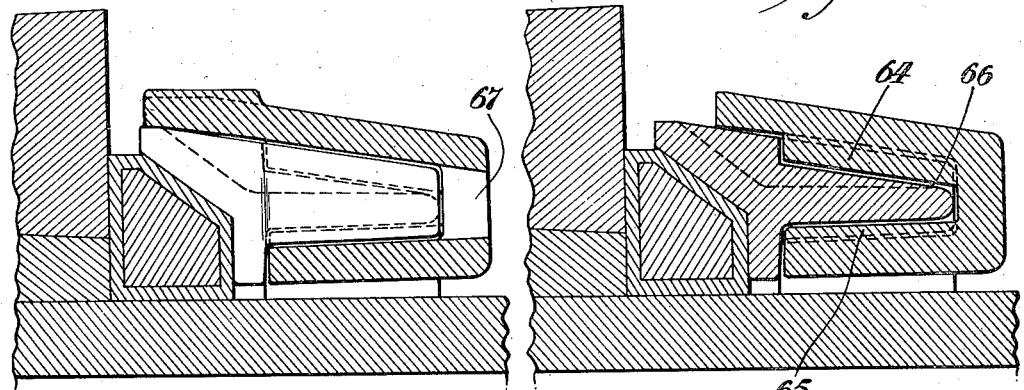
INVENTOR
Beauford E. Gavin
BY Clarence D. Kerr
HIS ATTORNEY Patented Nov. 3, 1936

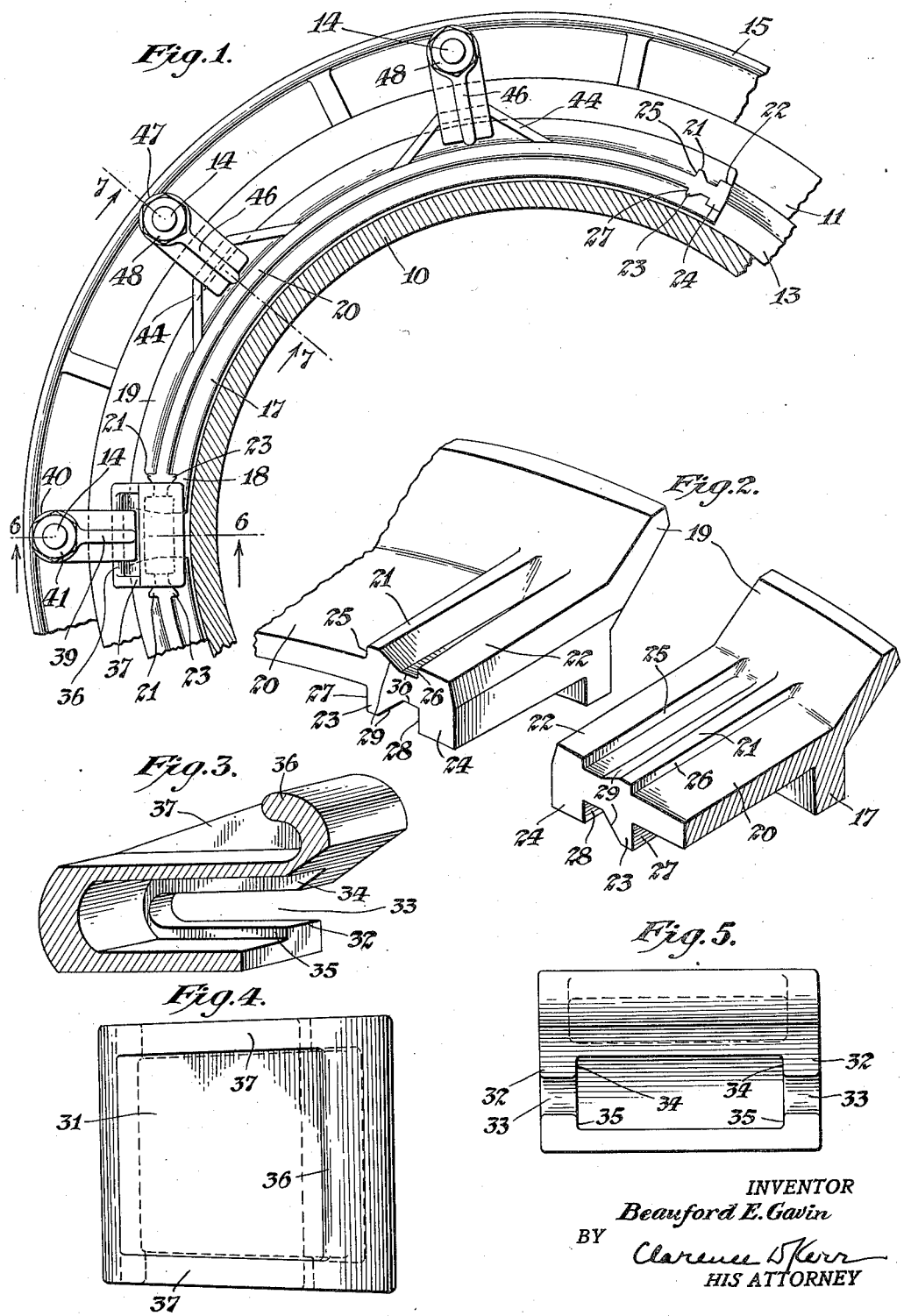

2,059,573

UNITED STATES PATENT OFFICE 2,059,573

PIPE CLAMP

Beauford E. Gavin, Indianapolis, Ind., assignor, by mesne assignments, to S. R. Dresser Manufacturing Company, Bradford, Pa., a corporation of Pennsylvania Application May 11, 1932, Serial No. 610,533

18 Claims. (Cl. 285—119)

This invention relates to pipe clamps of the type adapted to be assembled around an existing pipe joint to make it tight. In my pending application Ser. No. 577,431 filed November 27, 1931 I have disclosed a form of sectional pipe clamp adapted for the same general purpose. The present invention is in the nature of an improvement in that it enables a given clamp structure to be utilized with equal effectiveness in connection with pipes of varying diameters. This is a particularly important advantage in dealing with the repair of pipe lines which have been in existence for some time. It has been found in connection with such lines that the outside diameters of the pipe sections of a given nominal standard size may vary considerably. A clamp which is adapted to fit around the pipes of this sort of largest diameter are too large to function properly in connection with smaller pipes.

It has been an important object of the present invention, therefore, to provide a clamp which is adjustable or variable as to size so that it may be used without disadvantage on pipes having a considerable variation in diameter. For this purpose the clamping ring, which as usual may be suitably adapted to force a gasket or similar packing member into the joint between a bell and spigot connection, is formed in a plurality of sections. The adjacent ends of the sections are adapted to be joined or connected in such a way as to provide either a shortened or a lengthened circumference, or an intermediate circumference, as desired. This may be accomplished in various ways. Each section may, if desired, be provided with complemental ends so that the end of one section will directly interengage with the complementally formed end of another section. If preferred the two ends of each section may be formed alike and a separate connecting member may be provided to join the adjacent ends of the sections. In either construction the inter-fitting elements will be so formed that the ends of the sections may be joined together in several different relations, i. e. with their ends or other portions spaced at different distances apart, as desired.

With this general explanation of the nature of the invention several typical embodiments of the same will now be described in detail, reference being had to the accompanying drawings in which:

Fig. 1 is a sectional view through a portion of a pipe showing in elevation an illustrative form of clamp embodying the invention.

Fig. 2 is an enlarged perspective view of the two adjacent ends of clamp sections adapted to be joined by a connecting member.

Fig. 3 is a perspective view of a half portion of one of the connecting members.

Fig. 4 is a top plan view of one of the connecting members.

Fig. 5 is a front elevation of this member.

Fig. 6 is a longitudinal section through a pipe joint, taken along the line 6—6 of Figure 1, showing the improved clamp applied.

Fig. 7 is a similar view along the line 7—7 of Figure 1.

Fig. 8 is a front elevation, partly broken away, of a joint between two directly connected clamp sections embodying a modified form of the invention.

Fig. 9 is a plan view of the joint shown in Figure 8.

Figs. 10 and 11 are sectional views through the joint taken respectively along the lines 10—10 and 11—11 of Figure 9.

Fig. 12 is a perspective view of the adjacent ends of two ring sections showing a separate spacer element inserted therebetween.

Referring now to the drawings, one form of the invention is illustrated in Figures 1 to 7, inclusive. The improved clamping ring is shown as applied to a joint between the spigot end 10 of one pipe section and the bell end 11 of an adjacent pipe section. The annular space between the bell and spigot ends of the two pipes is filled in the usual way with lead or other suitable packing material. In order to prevent leaks at the joints, a gasket 13 formed of rubber or other suitable material is adapted to be forced against the end of the bell and against the outer surface of the spigot end of the connected pipe. The gasket 13 is adapted to be forced into position by means of the clamping ring forming the subject matter of the present invention. This ring in turn is clamped in position by means of a series of bolts 14 anchored at one end by means of a bull ring 15 cooperating with a shoulder formed by an enlarged portion 16 of the bell. The bull ring 15 may be of any suitable construction, preferably being formed in several sections to adapt it to be applied to an existing pipe joint.

The improved clamping ring is illustrated as being formed in a plurality of sections 17, each curved over a suitable portion of the arc of a circle. Any convenient number of sections may be employed. Ordinarily it will be found quite desirable to form the ring in three sections, each extending over an arc of substantially 120°. Each section is provided with a vertically extending flange 18 and an angularly extending flange 19 adapted to cooperate with corresponding surfaces on the gasket. The arrangement of these flanges is such that the force of the clamping bolts will be transmitted in the proper direction to hold the gasket as desired. A relatively wide flange 20 is also provided in the manner and for the purpose more fully explained in the pending application hereinbefore mentioned. The flanges 20, extending in a direction substantially parallel with the axes of the connected pipes, serve to provide the ring as a whole with a desirable rigidity, tending to resist a rolling-over of the ring sections. Adjacent each end of each of the sections there is provided a pair of ribs or projections 21 and 22 extending upwardly from the flange 20 and a corresponding pair of ribs or projections 23 and 24 extending downwardly from the flange 20. These projections provide a series of shoulders 25 and 26 above the flange and a corresponding series of shoulders 27 and 28 below the flange, all arranged in planes passing substantially radially through the axis of the ring. The surfaces 29 of the projections 21 and 23, which are opposite the shoulders 26 and 28, are preferably bevelled or chamfered in the manner indicated. Between the projections 21 and 22 as well as between the projections 23 and 24 there are provided surfaces 30 which are, in effect, extensions of the upper and under surfaces of the flange 20.

For the purpose of uniting the adjacent ends of the several sections, there is provided a connecting member 31 adapted to bridge the gap between the ends of the sections and to hold the sections rigidly together in the manner to be explained. In transverse cross-section the members 31 are substantially U-shaped or forked thereby providing a portion adapted to extend over the ends of the adjoining ring sections and a portion adapted to extend under these ends. The ends of the members 31 are each partially closed by a wall 32 having a long slot 33 cut therein. The inner faces of the walls 32 provide shoulders 34 above the slots and shoulders 35 below the slots. In applying the connecting member to the ends of the ring sections the slots 33 are adapted to receive the flanges 20 of the respective sections or the corresponding portion of the ring sections between the surfaces 30. The shoulders 34 and 35 are then brought into operative engagement with either the shoulders 25 and 27 or the shoulders 26 and 28 of the ring sections. The thickness and form of the portions of the end walls 32 of the connecting member above and below the slots 33 should be such that they will slide easily along the surfaces 30 in the assembly of the parts and will tend to hold them firmly together. It will be apparent that the construction explained will permit the ends of two ring sections to be joined in three different relations; for example these ends may be brought relatively close together by bringing the two sets of shoulders 34 and 35 into cooperation with shoulders 25 and 27 of both ring sections. On the other hand the ring sections may be spread relatively wide apart by bringing the two sets of shoulders 34 and 35 into cooperation with the two sets of shoulders 26 and 28. An intermediate effect may be produced by bringing one set of shoulders 34 and 35 into cooperation with one set of shoulders 25 and 27 while the other shoulders 34 and 35 may be brought into cooperation with the other set of shoulders 26 and 28.

Each of the members, 31 is provided at its top with a curved or hooked portion 36 along one edge which, with flanges 37 formed as upper extensions of the ends of the member, provides a pocket for the reception of the nose 38 of a dog 39 (see Fig. 6). An apertured portion 40 at the top of the dog permits the passage of one of the bolts 14 and is adapted to be engaged by a nut 41 utilized in the clamping of the ring. An extension 42 of the dog cooperating with the outer face of the enlarged portion 16 of the bell end serves to prevent rotation of the dog and thus provides for a straight pull to be transmitted to the members 31 in a direction substantially parallel with the axis of the connected pipes. It will be apparent that if three arcuate ring sections are employed, three of the connecting members 31 will also be employed and three of the dogs 39 with their clamping bolts 14 will be utilized. Additional clamping bolts are preferably provided intermediate the three mentioned. For example, as shown in Fig. 1, two such additional bolts are provided between two of the dogs 39. One of these is disclosed in detail in Figure 7. At the appropriate points the angled flange 19 of the ring sections is extended into a hook 43 which, with angled ribs 44, forms a pocket for the reception of the nose 45 of a dog 46. The dog 46 has a somewhat different form from that of the dog 39 due to a slight difference between the forms of the hooked extensions 36 and 43. It will be apparent that with a slight modification of the parts, all of the dogs may be made alike, resembling either the dogs 39 or dogs 46, or possibly a variation of both. A bolt 14 is passed through an aperture in an upper extension 47 of the dog 46 and is provided with a nut 48 to clamp the parts in position. An extension 49 of the dog 46 serves the same purpose as the extension 42 of the dog 49.

It will be apparent from the foregoing that a construction is provided in which the clamping ring is made adjustable in size so that it may be adapted to pipes of somewhat varying diameter. At the same time the variation in the diameter will not be so great as to provide an objectionable deviation from a true circle as the result of the fixed curvature of the sections 17. The curvature of these sections may suitably be such as to correspond with the diameter of the ring formed by the smallest adjustment of the sections. In order to insure forcing the gasket into the joint at all points, including the portions opposite the gaps left between the adjacent sections 17 when they are not connected to form the smallest diameter ring, the gasket may be provided with a metal reinforcement. This may be in the form of a continuous hollow or solid ring within the gasket or may simply be in the form of small inserts adapted to bridge the gaps. These inserts may, for example, be hollow with $\tfrac{1}{16}$" walls and may follow the contour of the rubber say $\tfrac{1}{8}$" in from the outer wall of the gasket. If desired, the gasket might be made entirely of rubber and small ring sections may be provided to engage the ring at the points where the gaps are formed between the ends of the sections 17. The arrangement may be such that when the two sets of shoulders 34 and 35 are engaged with the two sets of shoulders 25 and 27, the ends of the sections 17 will be in direct engagement. Proper pressure upon all points of the gasket may then be brought about without special provisions. On the other hand when the shoulders 34 and 35 at one or both ends of a member 31 are in engagement with shoulders 26 and 28 of one or both ring sections, a small gap, whose width is determined by the particular connection selected, will exist between the ends of the sections 17 and a small segment of corresponding width may be placed between them or the above mentioned reinforcement of the gasket may be relied upon. If a separate small ring segment is employed it may suitably be provided with three flanges or legs corresponding generally, in cross-section, with the flanges 18, 19, and 20 of a ring section.

Referring now to Figures 8 to 11, inclusive, a modified form of construction is illustrated. In this form of the invention the separate, connecting elements 31 are eliminated. The ring sections 50 in lieu of having end formations which are identical or simply reversed, as in the case of the sections 17, are provided with complemental formations at the two ends. In this way the formation at one end of one section will cooperate with the formation at the opposite end of another ring section, the relation being such that the parts may assume various relative positions. Each ring section throughout substantially its entire length is provided with an axially extending flange 51, an upwardly angled flange 52 and a radial inwardly-extending flange 53. The arrangement of these flanges may be substantially the same as flanges 20, 19, and 18, respectively, of the ring sections 17. At one end of each section 50 there may be provided three ribs or projections 54, 55, and 56 providing three shoulders 57, 58, and 59 arranged substantially in radial planes passing through the central axis of the ring formed by the sections. Corresponding ribs or projections on the under side of the flange 51 provide a series of similar shoulders 60, 61, and 62. At the opposite end of each ring section there is formed a complemental, forked, hooded portion 63 provided with an inward projection 64 at the top and a similar inward projection 65 at the bottom. Between the forked projections of the enlarged portion 63 there is formed a narrow passage or slot 66. The form of the projections 64 and 65 is such as to readily fit in between the ribs or projections at the opposite end of an adjacent section forming the shoulders 57 to 62, inclusive. Projections 64 and 65 are provided with straight shoulders adapted to cooperate with any of the pairs of shoulders 57 and 60, 58 and 61, or 59 and 62. It will be apparent that the circumference of the ring formed by the connected sections may be varied to suit the particular requirements by engaging the pairs of projections 64 and 65 with the appropriate ones of the pairs of shoulders mentioned. A considerable variation in overall circumference may be provided by engaging the projections 64 and 65 of one section with one set of shoulders of the adjacent section while the projections 64 and 65 of another section may be engaged with either corresponding or different shoulders of its adjacent section. An opening 67 may be provided through the outer wall of the hooded portion 63, as shown to provide a suitable means of support for a core employed in the casting of the sections. It will be apparent that any of the provisions mentioned in connection with the first form of the invention for bridging the gaps in the gasket engaging flanges may be provided in the modified form as well, if desired.

While several illustrative forms of the invention have been disclosed in considerable detail, it will be understood that various modifications may be made without departing from the general principles and scope of the invention as defined by the claims. The terms employed herein are to be regarded as terms of description and not of limitation.

What I claim is:

1. A pipe joint clamping ring comprising a plurality of arcuate sections, and means including a series of spaced, radially projecting and axially extending shoulders on each end of each section for rigidly and variably joining the ends of said sections together independently of any engagement with the pipe to form a ring of variable size.

2. A clamping ring comprising a plurality of arcuate sections, and means including a series of spaced, radially projecting and axially extending shoulders on one of the adjacent ends of a pair of sections, and shouldered means associated with the other of said adjacent ends having sliding engagement with certain of said series of shoulders for rigidly and variably joining the ends of said sections together to form a ring of variable size.

3. A clamping ring comprising a plurality of arcuate sections, each section having a series of shoulders at its ends, and detachable means having shoulders adapted to cooperate with selected shoulders of said series to unite the sections.

4. A clamping ring comprising a plurality of arcuate sections, each section having complementally formed ends including elongated interfitting projections and recesses arranged upon relative axial sliding to connect said sections rigidly together and retain them in variable relation to vary the size of the ring.

5. A clamping ring of variable size which comprises a plurality of arcuate sections, a series of shouldered projections adjacent the end of one section, and means connected with the end of another section adapted to slide axially over and enclose one or more of said projections as desired to retain the parts rigidly in assembled relation.

6. A clamping ring of variable size which comprises a plurality of arcuate sections, a series of elongated projections adjacent the end of one section providing elongated shoulders having their longitudinal dimension parallel with the axis of the ring, and means connected with the end of the other section adapted to slide longitudinally over one or more of said projections as desired and interlock with one of said shoulders.

7. A clamping ring of variable size which comprises a plurality of arcuate sections each having an axially extending flange, a plurality of elongated rib formations on said flange adjacent one end of one of said sections, said formations extending in a direction substantially parallel with the axis of the ring, and means connected with the end of another section adapted to slide longitudinally of and to interlock with any selected one of said ribs.

8. A clamping ring of variable size which comprises more than two arcuate sections, and means for inter-connecting said sections in variable relation comprising a plurality of radially projecting and axially extending, elongated inter-locking shoulders adapted to be selectively engaged by a longitudinal sliding movement.

9. A clamping ring of variable size which comprises a plurality of arcuate sections, and means for inter-connecting said sections in variable relation comprising a plurality of elongated shoulders adjacent the ends of said sections, and shouldered means adapted to selectively slide longitudinally along the shoulders on said sections and forming the sole connection between said sections.

10. A clamping ring of variable size which comprises a plurality of arcuate sections, and means for interconnecting said sections in variable relation comprising a plurality of shoulders adjacent each end of each section, and separable means having shoulders adapted to selectively cooperate with the shoulders on said sections.

11. A clamping ring of variable size which comprises a plurality of arcuate sections each having an axially extending flange, a plurality of shoulders on said flanges, and shouldered means for variably and selectively engaging said flange shoulders to inter-connect said sections in different relations.

12. A clamping ring of variable size which comprises a plurality of arcuate sections each having an axially extending flange, a plurality of shoulders on said flanges, and separable means having shoulders adapted to variably and selectively engage said flange shoulders to join said sections in different relations.

13. A clamping ring of variable size which comprises a plurality of arcuate sections each having an axially extending flange, a plurality of ribs extending above and below said flange adjacent the ends of said sections, and forked means provided with shoulders adapted to selectively engage said ribs and hold said sections together.

14. A pipe joint clamp comprising a bull ring, a clamping ring including a plurality of arcuate sections, rib formations adjacent the ends of said sections, separable means adapted to engage said rib formations to join said sections and retain them in assembled relation, and clamping means engaging said separable means, said clamping means including bolts and being anchored by said bull ring.

15. In a bell and spigot pipe clamp, a ring formed in sections, and interfitting means associated with said sections slidable a definite distance into cooperative engagement for uniting the ends of the sections to form a rigid ring, said means being adapted to unite the ends in a plurality of predetermined relations to vary the size of the ring.

16. A clamping ring comprising a plurality of arcuate sections, one end of each of said sections having an axially extending shoulder and the other end a plurality of axially extending shoulders, and means engaging a shoulder at each of the adjacent ends of a pair of sections for rigidly securing said sections together in any of a plurality of definite different relations to vary the size of the ring.

17. A pipe joint clamp comprising a bull ring, a gasket engaging the pipe joint, a clamping ring including a plurality of separated arcuate sections each having a gasket engaging surface, means for variably connecting said sections to form a ring of variable size, means for tying said bull ring and connecting means together and means between the ends of said separated arcuate sections filling the space therebetween and having a surface thereon forming a continuation of the gasket engaging surfaces of said sections.

18. A pipe joint clamp comprising a bull ring, a clamping ring including a plurality of disengaged arcuate sections, detachable means engaging the ends of a pair of said sections for rigidly securing said sections together in any of a plurality of predetermined relations to vary the size of the ring and for retaining the parts in assembled relation, and clamping means including bolts for tying said bull ring and said connecting means together.

BEAUFORD E. GAVIN.